United States Patent
Tymes et al.

(10) Patent No.: US 11,535,403 B1
(45) Date of Patent: Dec. 27, 2022

(54) CUSTOMIZATION AND AUTOMATION OF LAUNCH VEHICLE

(71) Applicant: CubeCab Inc., Los Altos, CA (US)

(72) Inventors: Adrian Tymes, Mountain View, CA (US); Charles Prale, San Jose, CA (US); Dustin Still, Salinas, CA (US); Andrew Baton, Adelaide (AU)

(73) Assignee: CubeCab Inc., Mountain View, CA (US)

( * ) Notice: Subject to any disclaimer, the term of this patent is extended or adjusted under 35 U.S.C. 154(b) by 118 days.

(21) Appl. No.: 16/661,750

(22) Filed: Oct. 23, 2019

Related U.S. Application Data (60) Provisional application No. 62/767,506, filed on Nov. 14, 2018.

(51) Int. Cl.
*B64G 1/00* (2006.01)
(52) U.S. Cl.
CPC ...................................... *B64G 1/00* (2013.01)
(58) Field of Classification Search
CPC .................................. B64G 1/00; B64G 1/002
See application file for complete search history.

(56) References Cited

U.S. PATENT DOCUMENTS

| | | | |
|---|---|---|---|
| 2,481,910 A | 9/1949 | D'Ardenne | |
| 3,842,771 A | 10/1974 | Bodinaux | |
| 5,212,946 A | 5/1993 | Hans et al. | |
| 5,593,110 A * | 1/1997 | Ransom | B64G 1/40 244/3.23 |
| 5,719,349 A | 2/1998 | Canaday et al. | |
| 5,927,653 A * | 7/1999 | Mueller | B64G 5/00 244/164 |
| 7,931,237 B2 * | 4/2011 | Penzo | F42B 15/10 244/173.1 |
| 9,194,678 B2 | 11/2015 | Teetzel et al. | |
| 10,023,329 B1 * | 7/2018 | Mbamalu | B64G 1/62 |
| 2006/0016928 A1 | 1/2006 | Thomas et al. | |

(Continued)

OTHER PUBLICATIONS

NASA "6. Launch Vehicles and Earth Departure Stages" Mar. 16, 2010 https://web.archive.org/web/20100316074225/https://www.nasa.gov/pdf/140637main_ESAS_06.pdf.*

*Primary Examiner* — Justin M Benedik
(74) *Attorney, Agent, or Firm* — Los Altos Law (57) ABSTRACT

Devices and techniques including possibly mass-produced manufacture of fungible launch vehicles, suitable for customization to payload specification, and programming to achieve specified delivery. Speed of assembly is adjustable to demand for deliveries. Customization occurs after manufacture and delivery and in response to payload specification. Payload specification includes weight and balance, volume, packaging, and release mechanism and order. No individual launch vehicle is manufactured to meet any particular specification. Launch vehicles are delivered from assembly to a launch site or nearby storage. Launch vehicles can be allocated and customized upon demand, at the time of launch. Customization includes adjustment of weight and balance, attitude control, or air launch parameters. Software receives specifications of individual payloads and delivery parameters and determines customizations to achieve those specifications and parameters. Models of operation of launch vehicles and payload delivery can be updated in response to results of a launch.

19 Claims, 2 Drawing Sheets

(56) References Cited

U.S. PATENT DOCUMENTS

| | | |
|---|---|---|
| 2006/0049316 A1 | 3/2006 | Antonenko et al. |
| 2007/0194171 A1* | 8/2007 | Diamandis .............. A63K 3/00 244/10 |
| 2010/0019084 A1* | 1/2010 | Sisk ..................... G06Q 10/087 244/1 R |
| 2010/0326045 A1 | 12/2010 | Lai |
| 2014/0370776 A1 | 12/2014 | Boren |
| 2015/0247714 A1 | 9/2015 | Teetzel et al. |

* cited by examiner

CUSTOMIZATION AND AUTOMATION OF LAUNCH VEHICLE

INCORPORATED DISCLOSURE

Priority Claim

This application claims priority of U.S. Provisional Application No. 62/767,506, filed Nov. 14, 2018, in the name of the same inventors, having the same title.

This document is hereby incorporated by reference as if fully set forth herein. Techniques described in this Application can be elaborated with detail found therein. This document is sometimes referred to herein as the "Incorporated Disclosure," or variants thereof.

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Field of the Disclosure

This Application generally describes techniques relating to customization and automation of launch vehicles, and other issues.

Related Art

Launch vehicles for delivering objects to destinations in space (including to suborbital trajectories, to near-earth orbit, to higher orbit, and to other celestial bodies) can be quite sensitive to the payload's characteristics, such as weight and balance, volume, packaging, release mechanism, and otherwise. With a different payload for each launch vehicle, this might have the effect that launch vehicles should be researched, designed, and manufactured to order, with respect to the payload they are intended to carry.

When launch vehicles are so manufactured with respect to payloads, construction of launch vehicles typically waits to begin until the payload is fully specified. It might also occur, when payloads include more than one object for delivery, that the payload's specification is not completely known until all such objects are accounted for, until their packaging with respect to the launch vehicle is accounted for, until their order of release is accounted for, or until their intended destinations are accounted for. Once these payload features are identified, the launch vehicle can be designed to provide for all payload objects and all payload specifications.

This can have the effect that speed of construction is limited by assignment of objects to payloads, by assignment of payloads to an order of launch, or possibly by sales of payload slots once the launch vehicle is designed or partially manufactured. While design and manufacture of launch vehicles to order can generally achieve the goal of launching payloads, it is subject to some drawbacks. For example, construction of launch vehicles might be substantially slowed relative to the speed with which they could otherwise be designed and manufactured, and delivery of payloads and their component objects might be substantially delayed relative to the speed with which they could otherwise be packaged and launched.

This can also have the effect that speed of payload launch is limited by design and manufacture of launch vehicles suitable for those payloads, particularly when those payloads are delicate, expensive, or include important equipment. For example, satellites including important equipment have been known to wait several months between readiness for launch of the satellite and readiness for launch of the launch vehicle intended to deliver the satellite. While design and manufacture of launch vehicles suited to payloads that are ready to launch can generally achieve the goal of launching payloads, it is subject to some drawbacks. For example, rapid delivery of important payloads might be substantially delayed while launch vehicles are prepared for those payloads.

Each of these issues, as well as other possible considerations, might cause difficulty in aspects of addressing problems relating to automated customization of launch vehicles, or other issues, as further described herein.

Other methods are described in the following documents: U.S. Pat. Nos. 2,481,910; 3,842,711; 5,212,946; 5,719,349; 7,931,237 B2; U.S. Pat. No. 9,194,678 B2; US 2006/0016928 A1; US 2006/0049316 A1; US 2010/0326045 A1; US 2014/0370776 A1; US 2015/0247714 A1.

SUMMARY OF THE DISCLOSURE

This summary of the disclosure is provided as a convenience to the reader, and does not limit or restrict the scope of the disclosure or the invention. This summary is intended as an introduction to more detailed description found in this Application, and as an overview of techniques explained in this Application. The described techniques have applicability in other fields and beyond the embodiments specifically reviewed in detail.

This Application describes devices and techniques including (possibly mass-produced) manufacture of substantially fungible launch vehicles, each suitable for customization to payload specification, and each suitable for programming to achieve delivery of payloads as specified. In one embodiment, the fungible launch vehicles can each be disposed to deliver relatively small payloads, such as between about one kilogram and five kilograms mass, and such as between about 1000 cm$^3$ and about three times that volume; however, in the context of the invention, there is no particular requirement for any such limitation.

The devices and techniques can be combined with devices and techniques disposed to perform similar functions with respect to other launch vehicles and devices related to launch vehicles, other payloads and devices related to payloads, including for example techniques for disposing payloads to their selected delivery parameters upon exit from launch vehicles, or otherwise. The devices and techniques can also be combined with other and further techniques related to launch vehicles, payloads, and related devices.

BRIEF DESCRIPTION OF THE FIGURES

In the figures, like references generally indicate similar elements, although this is not strictly required. After reading this Application, those skilled in the art would recognize that the figures are not necessarily drawn to scale for construction, nor do they necessarily specify any particular location or order of construction.

After reviewing this Application, those skilled in the art would recognize that the figures do not necessarily show all possible embodiments of the invention, all possible uses for the invention, or all elements of any particular embodiments of the invention.

DETAILED DESCRIPTION

General Discussion

This Application describes devices and techniques including (possibly mass-produced) manufacture of substantially fungible launch vehicles, each suitable for customization to payload specification, and each suitable for programming to achieve delivery of payloads as specified. In one embodiment, the fungible launch vehicles can each be disposed to deliver relatively small payloads, such as between about one kilogram and five kilograms mass, and such as between about 1000 $cm^3$ and about three times that volume; however, in the context of the invention, there is no particular requirement for any such limitation.

In one embodiment, the techniques can include a (possibly automated) assembly line capable of manufacturing launch vehicles that are disposed to deliver payloads. For example, the speed of the assembly line can be altered to account for demand for payload delivery. Each launch vehicle can be customized for its specific payload, after manufacture and delivery of the launch vehicle and in response to specification of the payload. Specification of the payload can include the payload's characteristics, including weight and balance, volume, packaging, release mechanism, order of release (when the payload includes more than one deliverable object), and otherwise. Individual payloads can be unique; no individual launch vehicle need be manufactured to meet the specification of any particular payload.

In one embodiment, the fungible launch vehicles can be delivered (individually or in batches) from the assembly line to a shipping point (such as an airport, railhead, seaport, or trucking station). The shipping point can be disposed to allow launch vehicles to be moved to a launch site, or to a storage depot or warehouse sufficiently nearby. Individual launch vehicles can be allocated to payloads upon demand and customized to each payload in response to each specification of an individual payload, such as substantially at the time of launch. For example, customization can be in response to features of each individual payload and the individual payload's desired delivery parameters. For another example, customization can include adjustment of the weight and balance of the launch vehicle (such as by addition of mass by adding ballast to the payload at designated locations), adjustment of attitude control of the launch vehicle (such as by adjustment of fins and flaps), adjustment of air launch parameters of the launch vehicle (such as by adjustment of launch altitude, launch angle, and launch direction), or otherwise.

In one embodiment, a software component can receive specifications of individual payloads and specifications of delivery parameters. The software component can determine one or more customizations to be performed on fungible launch vehicles to achieve those specifications and parameters. For example, the customizations can be determined in response to simulation of the launch vehicle and payload, such as in response to one or more empirical models of operation of launch vehicles and payload delivery. Engineers can perform those customizations on fungible launch vehicles, dispose payloads on customized launch vehicles, and use the customized launch vehicles to deliver the payloads as desired. In one embodiment, the one or more empirical models of operation of launch vehicles and payload delivery can be updated in response to results of a launch.

Figures and Text

Methods of operation can include steps as described herein. While the steps are shown and described in a linear order, in the context of the invention, there is no particular requirement for any such limitation. Except where explicitly stated, there is no particular requirement for the steps to be encountered or performed linearly, or in any particular order or by any particular device. For example and without limitation, the steps can be encountered or performed in parallel, in a pipelined manner.

Although this Application primarily describes one preferred technique for generating the conformational candidate, in the context of the invention, there is no particular requirement for any such limitation. Other techniques for generating the conformational candidate would be workable, and could be incorporated into the method along with the techniques for generating conformational variants. The conformational candidate could even be received from another system or program routine.

Example System

Figure 1:
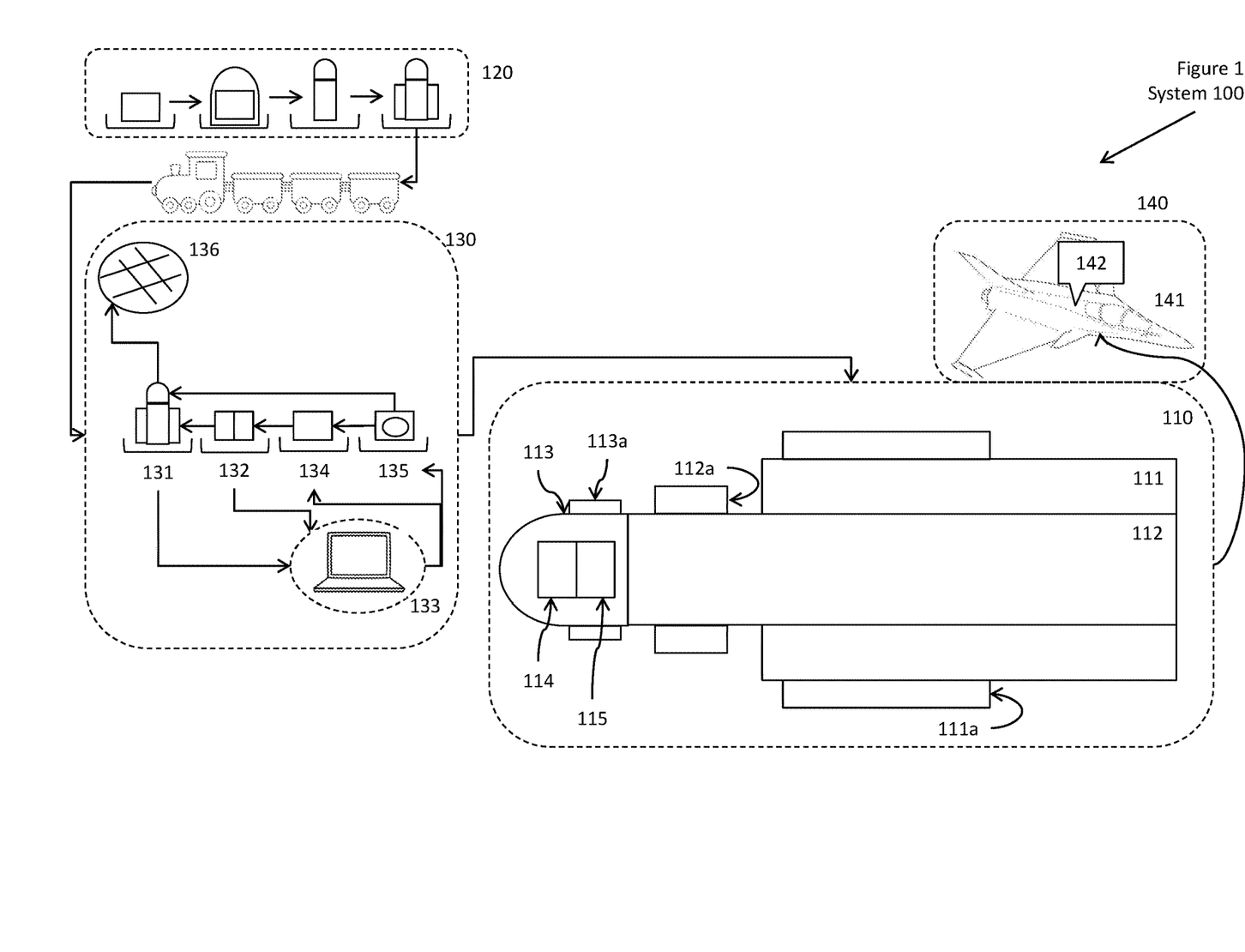
FIG. 1 shows a conceptual drawing of an example system.

FIG. 1 shows a conceptual drawing of an example system.

An example system is described with respect to elements as shown in the figure, and as otherwise described herein, such as:

the system 100, considered as a whole;
    one or more launch vehicles 110;
    one or more construction sequences 120;
    one or more adjustment sequences 130;
    one or more launch elements 140, which are not necessarily part of the system.

Launch Vehicles

In one embodiment, the one or more launch vehicles 110 can include a first stage boost element 111, a second stage boost element 112, a third stage boost element 113, and one or more payload compartments 114. The payload compartments 114 can be disposed to maintain one or more payload elements 115, such as satellites or other devices for delivery to one or more destinations.

In one embodiment, the first stage boost element 111, the second stage boost element 112, and the third stage boost element 113, can be disposed so that the first stage boost element 111 boosts the second and third stage boost elements and the payload compartments 114, the second stage boost element 112 boosts the third stage boost element 113 and the payload compartments 114, and the third stage boost element 113 boosts the payload compartments 114. In such cases, the payload compartments 114 maintain the payload elements 115, with the effect that boosting the payload compartments 114 also boosts the payload elements 115.

The first stage boost element 111 can include attitude adjustment devices 111a, such as fins, flaps, and/or other devices. The attitude adjustment devices 111a can be disposed to adjust: an angle of boost of the first stage boost element 111; an amount of lift associated with the first stage boost element 111; an amount of pitch, spin, or yaw associated with the first stage boost element 111; and/or other parameters associated with boosting effects. As further described herein, the attitude adjustment devices 111a are usable to adjust planned operation of the launch vehicles 110 in response to parameters of the While this Application primarily describes launch vehicles 110 with attitude adjustment devices 111a coupled only to the first stage boost element 111, in the context of the invention, there is no particular requirement for any such limitation. For example, the second stage boost element 112 can (optionally and similarly) include second attitude adjustment devices 112a, which can be deployed upon substantially completed boosting by the first stage boost element 111, and the third stage boost element 113 can (optionally and similarly) include third attitude adjustment devices 113a, which can be deployed upon substantial completed boosting by the second stage boost element 112.

In one embodiment, each boost element 111, 112, or 113, can include a solid rocket booster or another technique for accelerating the payload compartment 114 and the payload elements 115. In one embodiment, the launch vehicles 110 can be boosted from altitude, such as initial launch after being lifted to altitude by the one or more launch elements 140.

While this Application primarily describes launch vehicles 110 with boost elements 111, 112, or 113, that use solid rocket boosters, in the context of the invention, there is no particular requirement for any such limitation. For example, the boost elements 111, 112, or 113, can use liquid fuel rockets, jet engines, ramjet engines, ion rocket boosters, or some combination thereof, or otherwise.

While this Application primarily describes launch vehicles 110 with more than one boost element, in in the context of the invention, there is no particular requirement for any such limitation. For example, the launch vehicles 110 can leave out the first stage boost element 111 and the second stage boost element 112, and include only the third stage boost element 113. For another example, the launch vehicles 110 can leave out the first stage boost element 111, and include only the second stage boost element 112 and the third stage boost element 113.

In one embodiment, the payload compartments 114 can include one or more payload elements 115, While this Application primarily describes systems 100 including launch vehicles 110 with a single payload compartment 114, which itself has a single payload element 115, in the context of the invention, there is no particular requirement for any such limitation. For example, launch vehicles 110 can include more than one payload compartment 114, each of which can separately deliver one or more payload elements 115 to their designated destinations. For another example, launch vehicles 110 can include payload compartments 114 each of which can deliver more than one payload element 115 to their designated destinations.

Launch Elements

The launch elements 140 can include an aircraft 141 (such as a jet aircraft) including a carriage 142 disposed to hold one or more launch vehicles 110 and lift those launch vehicles 110 to altitude. The launch vehicles 110 can be released from the carriage 142, either individually or in multiples, with the effect that that launch vehicles 110 can boost after release. Alternatively, the launch vehicles 110 can boost directly from the carriage 142, either individually or in multiples, with the effect that the launch vehicles 110 can boost from the launch elements 140 without necessarily being explicitly released. In either such case, the launch vehicles 110 can boost from an altitude, at an angle, and in a direction, selected at a time after being lifted to altitude.

While this Application primarily describes launch vehicles 110 that are lifted to altitude and released by gravity or mechanical ejection from the carriage 142, in the context of the invention, there is no particular requirement for any such limitation. For example, the carriage 142 can itself include some boost capability. The carriage 142 can include an electromagnetic accelerator, mechanical catapult, steam catapult, or another technique for imparting an initial velocity to the launch vehicles 110 when they are released from the launch element 140. In such cases, the launch element 140 can impart a selected initial velocity to the launch vehicles 110 (in addition to the velocity of the launch element 140 itself, such as when the launch elements 140 include aircraft 141), with the effect that the launch vehicles 110 boost with that initial velocity, selected at a time after being lifted to altitude.

While this Application primarily describes launch vehicles 110 being lifted to altitude by an aircraft 141, in the context of the invention, there is no particular requirement for any such limitation. For example, the launch elements 140 can lift the launch vehicles 110 to altitude using another type of vehicle, such as a balloon, a helicopter, an orbital or suborbital vehicle, or otherwise.

While this Application primarily describes the launch elements 140 including techniques for disposing the launch vehicles 110 to boost from altitude, in the context of the invention, there is no particular requirement for any such limitation. For example, the launch elements 140 can dispose the launch vehicles 110 to boost from a ground launch location (not shown), or from an orbital or suborbital position (not shown). In either such case, the launch vehicles 110 can boost either with or without imparting a selected initial velocity, and can boost from an altitude, at an angle, and in a direction, selected at a time after being disposed at the launch elements 140.

Construction Sequences

The construction sequences 120 can include a (possibly at least partially automated) assembly line disposed to manufacture (possibly to mass-produce manufacture) substantially fungible launch vehicles 110. As further described herein, the launch vehicles 110 can each include a one or more boost elements 111, 112, 113, and a payload compartment 114. In one embodiment, the construction sequences 120 produce substantially fungible launch vehicles 110, each suitable (as further described herein) for customization to payload specification, and each suitable (as further described herein) for programming to achieve delivery of payloads as specified.

In one embodiment, the substantially fungible launch vehicles 110 can each be disposed to deliver relatively small payload elements 115. For example, the payload elements 115 can be between about one kilogram and about five kilograms mass, and can be between about 1000 cm$^3$ (such as formed by a cube 10 cm on each side) and about three times that volume (such as formed by three such cubes, such as collinearly aligned or otherwise). While this Application primarily describes payload elements 115 having such sizes, in the context of the invention, there is no particular requirement for any such limitation.

In one embodiment, the assembly line 121 can be disposed to be accelerated/decelerated in response to perceived need for more/fewer launch vehicles 110. Similarly, in one embodiment, the adjustment sequences 130 (as further described herein) can also be disposed to be accelerated/decelerated in response to perceived need to adjust more/fewer launch vehicles 110 for launch.

In one embodiment, the manufactured launch vehicles 110, each having boost elements 111, 112, 113, and payload compartments 114, but without actual payload elements 115, can use transportation from the construction sequences 120 to the adjustment sequences 130. For example, the transportation can include one or more of air, land, or sea transport. For another example, the transportation can include railway or truck transport, air or sea transport, or a combination thereof. This can have the effect that manufactured launch vehicles 110 can be made ready for processing and launch substantially at a launch site (such as an airport when the launch elements 140 include aircraft 141) and substantially at a desired time of launch.

Adjustment Sequences

In one embodiment, the adjustment sequences 130 can include a (possibly automated) sequence of stages disposed to adjust the substantially fungible launch vehicles 110 to make them ready for launch to deliver payloads.

The adjustment sequences 130 can include elements as shown in the figure, and as otherwise described herein, such as:

a launch vehicle receipt position 131;
a payload receipt position 132;
a simulation element 133;
a ballast element ready position 134;
a launch vehicle control element 135; and
a launch position 136.

As further described herein the fungible launch vehicles can be delivered (individually or in batches) from the assembly line to a shipping point: such as an airport, railhead, seaport, or trucking station (not shown). The shipping point can be disposed to allow launch vehicles to be moved to a launch site, or to a storage depot or warehouse sufficiently nearby.

The launch vehicle receipt position 131 (such as the shipping point or a storage depot disposed substantially nearby) can include a location to which launch vehicles 110 have been delivered by transportation from the construction sequences 120 to the adjustment sequences 130, such as the storage depot or warehouse. One or more launch vehicles 110 delivered to the launch vehicle receipt position 131 can be thereafter adjusted in response to payload and delivery requirements.

After delivery to the launch vehicle receipt position 131, individual launch vehicles 110 can be allocated to payload elements 115 upon demand and customized to each payload (that is, each set of payload elements 115) in response to each specification of an individual payload, substantially at the time of launch. As further described herein, customization can be in response to features of each individual payload and the individual payload's desired delivery parameters. As also further described herein, customization can include adjustment of the weight and balance of the launch vehicle (such as by addition of mass by adding ballast to the payload at designated locations), adjustment of attitude control of the launch vehicle (such as by adjustment of fins and flaps), adjustment of air launch parameters of the launch vehicle (such as by adjustment of launch altitude, launch angle, and launch direction), or otherwise.

The payload receipt position 132 can include a location to which payload elements 115 have been delivered to be disposed in payload compartments 114. One or more payload elements 115 delivered to the payload ready position 133 can be disposed in payload compartments 114 for delivery by launch vehicles 110.

The simulation element 133 can include a computerized launch simulator, including one or more input elements and one or more output elements.

As further described herein, the input elements can receive specifications of individual payloads and specifications of delivery parameters. Although the launch vehicles 110 can be substantially fungible, not all launch vehicles 110 need be so. Accordingly, the input elements can receive specifications with respect to particular launch vehicles 110, with respect to new sets of fungible launch vehicles 110, and other information with respect to launch vehicles 110.

The input elements can also be disposed to receive information with respect to payload elements 115 and their delivery requirements (such as desired orbital or suborbital trajectories to which they should be delivered), with respect to weather conditions, with respect to other information with respect to flight of launch vehicles 110, and otherwise.

The output elements can be disposed to provide information with respect to customizations to be performed on the launch vehicles 110 to achieve those specifications and parameters. For example, these customizations can include changes to payload mass (including possible added ballast), specification of thrust amount and timing, specification of multi-stage separation and timing, specification of attitude control (such as altitude, direction, and timing of launch; adjustment of fins and flaps), specification of other flight control information; and otherwise.

For example, the customizations can be determined in response to simulation of the launch vehicle and payload, such as in response to one or more empirical models of operation of launch vehicles and payload delivery. In one embodiment, the simulation element 133 can include a Monte Carlo simulator disposed to determine, in response to information it receives, a set of likely scenarios for delivery of the launch vehicles 110. In such cases, the simulation element 133 can adjust launch parameters to achieve a set of parameters most likely to achieve the desired delivery of the payload elements 115, to achieve a set of parameters with greatest confidence that desired delivery of the payload elements 115 will occur, another statistical measure of success, or otherwise.

The ballast element ready position 134 can include a location at which additional payload mass, such as ballast elements, can be coupled to the payload compartment 114 or the payload element 115, such as being bolted onto the payload compartment 114 or the payload element 115, otherwise attached to the payload compartment 114 or the payload element 115, or otherwise coupled thereto. For example, a ballast element (such as a mass selected in response to output information from the simulation element 134) can be added to the payload compartment 114 when the payload element 115 is inserted therein.

The launch vehicle control element 135 can include an input coupled to a launch vehicle controller 116, disposed to control thrust amount and timing, multi-stage separation and timing, adjustment of fins and flaps, other flight control information; and otherwise, as output by the simulation element 134. The launch vehicle controller 116 can be disposed in the launch vehicle 110 and can be disposed to control such elements of the launch vehicle 110 as can be controlled after it is lifted to altitude and triggered to launch.

In response to customizations determined by the simulation element 133, engineers can perform those customizations on the launch vehicles 110, dispose payload elements 115 on the customized launch vehicles 110, and use the customized launch vehicles 110 to deliver the payloads elements 115 as specified. Similarly, in response to customizations determined by the simulation element 133, engineers can enter instructions at the input coupled to the launch vehicle controller 116. This can have the effect that the launch vehicle controller 116 coupled to a selected launch vehicle 110 can cause that launch vehicle 110 to follow those instructions and operate to deliver the payload element 115 as specified.

The launch position 136 can include a location at which the launch vehicle 110 is disposed for lift to altitude by the launch elements 140. For example, when the launch elements 140 include an aircraft 141, the launch position 136 can include a loading bay for the aircraft 141, such as might be disposed at an airport. When the launch vehicle 110 has been manufactured and delivered from the construction sequences 120 and has been customized at the to the adjustment sequences 130 (for its selected payload elements 115 and their characteristics, their selected delivery destinations, and otherwise), the launch vehicle 110 can be disposed in the launch elements 140 and lifted to altitude for launch.

In one embodiment, the simulation element 113 can receive information with respect to actual operation of the launch vehicle 110 and compare that information with respect to actual operation with its predicted operation. In response to any substantial differences between actual operation and predicted operation, the simulation element 113 can update its empirical models of operation with respect to launch vehicles and payload delivery.

Example Method of Operation

Figure 2:
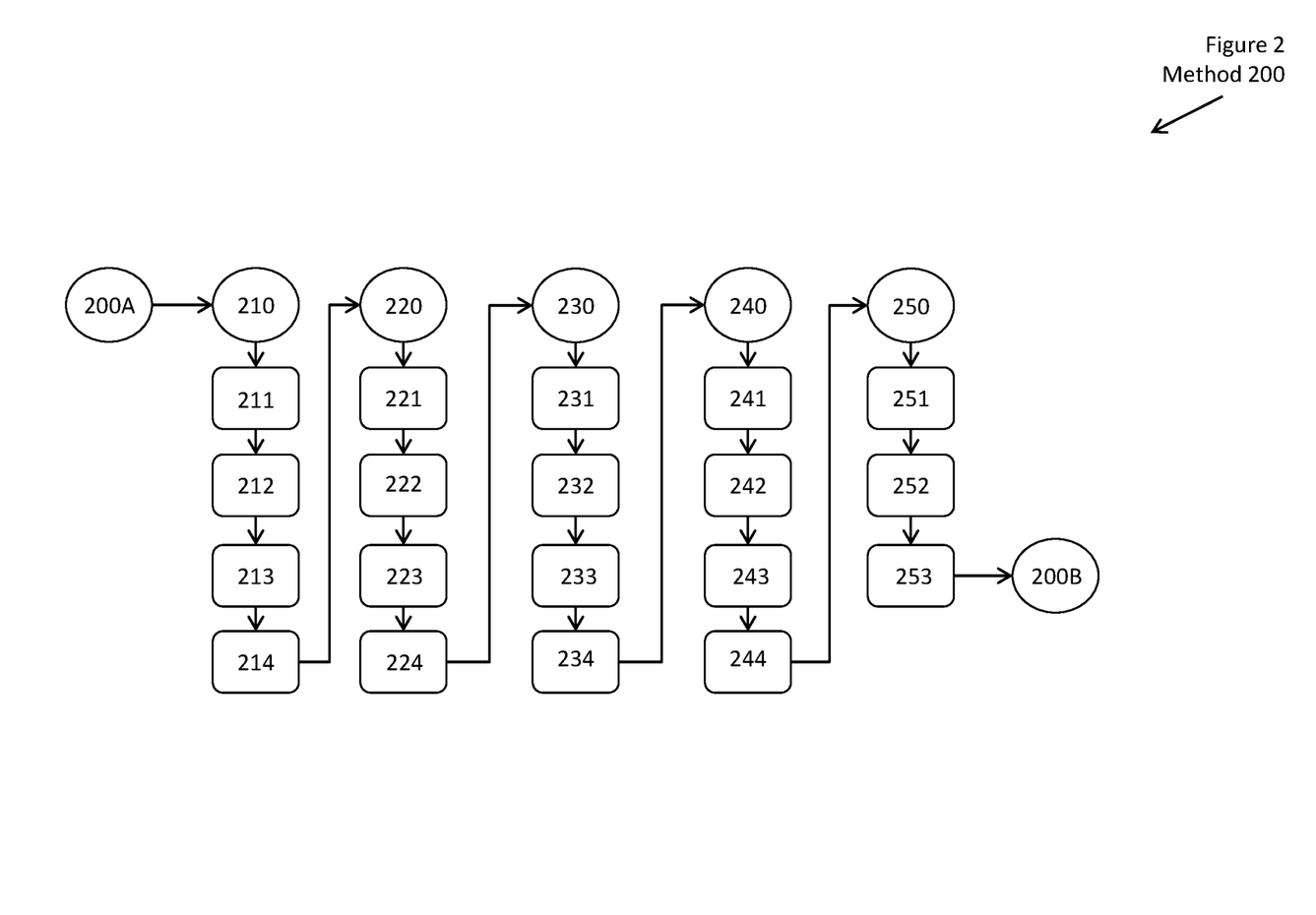
FIG. 2 shows a conceptual drawing of an example method of operation.

FIG. 2 shows a conceptual drawing of an example method of operation.

An example method 200 can include flow points and method steps as described herein. While the steps are sometimes described as being performed "by" or "using" particular elements, in the context of the invention, there is no particular requirement for any such limitation. For example, the steps can be performed by or using other elements in addition to or instead of the described elements. While the steps are sometimes described as being performed "by" or "using" the method itself, those steps can be performed by or using one or more elements as further described herein, or other such elements as those skilled in the art would understand after reading this Application.

Beginning of Method

A flow point 200a indicates that the method 200 is ready to begin. In one embodiment, the method 200 can be triggered by one or more of the following: an operator command, a triggering event (such as an incoming sensor value or other signal), passage of a designated amount of time (such as an amount of time since a most recent time the method 200 was triggered), arrival of a fungible launch vehicle 110, arrival of a payload element 115, arrival or departure of a launch element 140, launch or return of a customized launch vehicle 110, arrival or departure of another device, or otherwise.

Manufacturing Launch Vehicles

At a flow point 210, the construction sequences 120 are ready to manufacture substantially fungible launch vehicles 110.

At a step 211, the construction sequences 120 manufacture substantially fungible launch vehicles 110, according to selected construction parameters and at a selected rate.

At a step 212, the construction sequences 120 determine if the selected construction parameters or the selected rate should be modified. For example, the construction sequences 120 can be disposed to receive information to modify the selected construction parameters or the selected rate. If so, the method 200 proceeds with the next step (213). Otherwise, the method 200 skips the next step (213) and proceeds with the next step thereafter (214).

At a step 213, the construction sequences 120 modify the selected construction parameters or the selected rate, such as according to received information. The method 200 returns to and proceeds from the flow point 210.

At a step 214, the construction sequences 120 deliver the substantially fungible launch vehicles 110 to the adjustment sequences 130, such as using the selected transportation. While this Application primarily describes using the selected transportation to deliver the launch vehicles 110 to the adjustment sequences 130, in the context of this invention, there is no particular requirement for any such limitation. For example, the construction sequences 120 can already be disposed near the adjustment sequences 130, with the effect that substantial transportation is not required. The method 200 proceeds with the next flow point.

Adjusting Launch Vehicles

At a flow point 220, the adjustment sequences 130 are ready to adjust the substantially fungible launch vehicles 110.

At a step 221, the adjustment sequences 130 receive the substantially fungible launch vehicles 110.

At a step 222, the adjustment sequences 130 receive information with respect to selected payload elements 115, their selected delivery parameters (such as orbital or suborbital parameters), launch conditions (such as weather), and possibly otherwise.

At a step 223, the adjustment sequences 130 (including the simulation element 133) determine adjustments to make to the launch vehicles 110.

As a part of this step, the simulation element 133 receives information with respect to the payload elements 115 (such as its mass), the selected delivery parameters (including altitude, direction, speed, and possibly otherwise), a set of historical launch vehicle performance information, and a model of launch vehicle behavior (such as ballistics, atmospheric drag, and otherwise). In response to this information, the simulation element 133 determines a set of launch vehicle parameters and payload release parameters (including altitude, direction, speed, and possibly otherwise). For example, the simulation element 133 can search the space of possible payload release parameters and model a set of results of those possible payload release parameters to determine if the payload elements 115 would be delivered according to the selected delivery parameters.

As a part of this step, the simulation element 133 determines if the determined set of payload release parameters is within an acceptable range of the third stage boost element 113. If so, the simulation element 133 determines a set of third stage attitude control parameters for later use by the third stage boost element 113. Otherwise, the simulation element 133 determines a set of adjustment parameters (such as ballast mass, third stage modeling, and possibly otherwise).

As a part of this step, the simulation element 133 determines if the determined set of payload release parameters is within an acceptable range of the second stage boost element 112. If so, the simulation element 133 determines a set of second stage attitude control parameters for later use by the second stage boost element 112. Otherwise, the simulation element 133 determines a set of adjustment parameters (such as second stage modeling and possibly otherwise).

As a part of this step, the simulation element 133 determines if the determined set of payload release parameters is within an acceptable range of the first stage boost element 111. If so, the simulation element 133 determines a set of first stage attitude control parameters for later use by the first stage boost element 111. Otherwise, the simulation element 133 determines a set of adjustment parameters (such as first stage modeling and possibly otherwise).

As a part of this step, the simulation element 133 determines a set of launch vehicle release parameters, such as angle of direction, location of release, time of release, velocity vector, and possibly otherwise.

As a part of this step, the simulation element 133 conducts Monte Carlo simulation of launch vehicle performance, using a random or pseudorandom source, to select an optimal (or nearly optimal) set of launch vehicle parameters and payload release parameters.

At a step 224, the simulation element 133 provides the launch vehicle parameters and payload release parameters to an operator of the launch vehicle 110 (such as a launch vehicle pilot) and possibly an operator of the launch element 140 (such as an aircraft pilot). The method 300 proceeds with the next flow point.

Preparing Launch Vehicles

At a flow point 230, the method 200 is ready to prepare one or more adjusted launch vehicles 110 for launch.

At a step 231, the launch vehicle 110 has its payload compartment 114 loaded with a selected payload element 115.

While this Application primarily describes systems in which adjusted launch vehicles 110 are prepared individually for launch, in the context of the invention, there is no particular requirement for any such limitation. For example, more than one such adjusted launch vehicle 110 can be prepared in parallel or in serial for a joint launch or for separate launches.

While this Application primarily describes systems in which payload compartments 114 are each loaded with individual payload elements 115, in the context of the invention, there is no particular requirement for any such limitation. For example, payload compartments 114 can be loaded with multiple such payload elements 115, which might be delivered separately or in multiples.

While this Application primarily describes systems in which adjusted launch vehicles 110 are individually launched, in the context of the invention, there is no particular requirement for any such limitation. For example, more than one such launch vehicle 110 can be disposed on one or more launch elements 140 and jointly or separately launched, either individually or in multiples.

At a step 232, the launch vehicle 110 has its payload element 115 disposed with any additional mass designated by the output from the simulation element 133. In one embodiment, the additional mass is disposed in the payload compartment 114 from the ballast element ready position 134.

At a step 233, the launch vehicle 110 is coupled to the launch vehicle control element 135. In one embodiment, any launch parameters designated by the output from the simulation element 133 are input to the launch vehicle control element 135. For example, the time to initial fuel burn, fuel burn rate, and any attitude adjustments for control surfaces are input to the launch vehicle control element 135.

At a step 234, the launch vehicle 110 is coupled to the launch position 136. For example, in such cases when the launch elements 140 include aircraft 141, the launch position 136 can include an aircraft runway, an aircraft taxi way near an aircraft runway, or a preparatory location near an aircraft taxi way. In such cases when the launch elements 140 include a carriage 142 disposed to hold the launch vehicle 110, the launch vehicle 110 can be coupled to the carriage 142. The method 300 proceeds with the next flow point.

Launching Launch Vehicles

At a flow point 240, the method 200 is ready to launch one or more adjusted launch vehicles 110.

At a step 241, the launch element 140 is disposed to lift the launch vehicle 110 to altitude (such as using the aircraft 141) and trigger the launch vehicle 110 to launch (such as from the carriage 142). For example, the aircraft 141 can perform a normal takeoff from an aircraft runway, climb to the altitude and heading (and when appropriate, angles of pitch, roll, or yaw) designated by the simulation element 133, and trigger the launch vehicle 110.

At a step 242, the launch element 140 ejects the launch vehicle 110 at altitude and triggers the launch vehicle 110 to launch. When appropriate, as part of the launch, the carriage 142 can impart any initial velocity vector designated by the simulation element 133. As further described herein, the launch vehicle 110 performs the fuel burn designated by the simulation element 133, with the attitude adjustments for control surfaces designated by the simulation element 133.

At a step 243, the launch vehicle 110 ejects the payload element 115, with any coupled ballast, from the payload compartment 114 at the position in its trajectory that was designated by the simulation element 133. This can have the effect that the payload element 115 is delivered to the orbital, suborbital, or other trajectory designated when the launch vehicle 110 was adjusted before launch (and after manufacture).

At a step 244, the payload element 115 is delivered to the trajectory selected for it, or at least as close thereto as the simulation element 133 was able to achieve. The method 300 proceeds with the next flow point.

Updating Launch Vehicle Model

At a flow point 250, the method 200 is ready to update its model of launch vehicle behavior.

At a step 251, the simulation element 133 receives information with respect to actual performance of the adjusted launch vehicles 110.

At a step 252, the simulation element 133 compares the actual performance of the adjusted launch vehicles 110 with its predicted performance. If the actual performance differs from the predicted performance by more than a selected threshold, the simulation element 133 performs the next step (253). Otherwise, the simulation element 133 skips the next step and continues with the next flow point (200b).

At a step 253, the simulation element 133 adjusts its model of the launch vehicle 110 to bring that model into line with the actual performance of the adjusted launch vehicles 110. The method 200 proceeds with the next flow point.

End of Method

A flow point 200b indicates that the method 200 is finished. The method 200 cleans up any hardware and software tools, including clearing and de-allocating any working memory. The method 200 disposes its hardware and software tools for possible re-triggering at the flow point 200a.

ALTERNATIVE EMBODIMENTS

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Methods of operation can include steps as described herein. While the steps are shown and described in a linear order, in the context of the invention, there is no particular requirement for any such limitation. Except where explicitly stated, there is no particular requirement for the steps to be encountered or performed linearly, or in any particular order or by any particular device. For example and without limitation, the steps can be encountered or performed in parallel, in a pipelined manner.

While this Application primarily describes techniques related to delivery of payload elements to their selected delivery parameters using rocketry, in the context of the invention, there is no particular requirement for any such limitation. Techniques described herein have broad applicability to other applications for delivery of payload elements, to delivery parameters selected in advance, to delivery parameters selected with respect to one or more conditions, and otherwise. Moreover, while specific advantages have been enumerated above, various embodiments may include these or other advantages.

After reading this Application, those skilled in the art would recognize other and further uses for the techniques described herein, including other and further techniques (including systems and methods) for rocketry and other delivery systems. The claims are hereby incorporated into this specification as if fully set forth herein. None of the appended claims or claim elements are intended to invoke 35 USC 112(f) unless the words "means for" or "step for" are explicitly recited in the claim.

The invention claimed is:

1. A method for delivering payload elements to a designated trajectory, the method including steps of
constructing one or more complete fungible launch vehicles, each disposed for further customization responsive to a selected payload specification;
customizing a selected one launch vehicle in response to said selected payload specification, after delivery and before launch of said selected one launch vehicle, the customization including adjustment with respect to the selected launch vehicle of air launch parameters, and one or more of: weight or balance, attitude control, to provide for the launch vehicle reaching the designated trajectory;
disposing the selected one launch vehicle to deliver a payload according to said selected payload specification.

2. A method as in claim 1, wherein
a result of said steps of customizing includes a customized launch vehicle, said customized launch vehicle being responsive to a delivery specification to deliver said payload according to said delivery specification.

3. A method as in claim 1, wherein
said selected payload specification includes a payload mass between about one kilogram and about five kilograms.

4. A method as in claim 1, wherein
said selected payload specification includes a payload volume between about 1000 cm3 and about three times that volume.

5. A method as in claim 1, wherein
said steps of constructing include steps of operating an assembly line disposed to manufacture launch vehicles to deliver payloads;
said assembly line is responsive to a signal disposed to adjust a speed thereof, said signal being responsive to a demand for payload delivery.

6. A method as in claim 1, wherein
said payload specification includes one or more of: weight and balance, volume, packaging, release mechanism, order of release when the payload includes more than one deliverable object.

7. A method as in claim 1, including steps of
delivering said fungible launch vehicles can be delivered from an assembly line to a shipping point;
wherein said shipping point includes one or more of: an airport, a railhead, a seaport, or a trucking station.

8. A method as in claim 7, wherein
said shipping point is disposed to allow launch vehicles to be moved to one or more of: a launch site, a storage depot near to said launch site.

9. A method as in claim 1, including steps of
allocating launch vehicles to payloads upon demand, substantially at a launch time;
wherein said steps of customizing are in response to each individual payload specification.

10. A method as in claim 2, wherein
the customization further comprises adjusting the deployment order of the payload.

11. A method as in claim 10, wherein
said adjustment of weight and balance includes adding ballast to the payload.

12. A method as in claim 10, wherein
said adjustment of attitude control includes adjustment of fins and flaps.

13. A method as in claim 10, wherein
said adjustment of air launch parameters includes adjustment of launch altitude, launch angle, or launch direction.

14. A method as in claim 1, including steps of
receiving specifications of individual payloads and specifications of delivery parameters;
determining one or more customizations to be performed on launch vehicles to achieve said specifications of delivery parameters of said specifications of individual pay-loads.

15. A method as in claim 14, wherein
said steps of determining one or more customizations are responsive to simulation of the launch vehicle and payload.

16. A method as in claim 14, wherein
said steps of determining one or more customizations are responsive to an empirical model of operation of launch vehicles and payload delivery.

17. A method as in claim 1, including steps of
disposing payloads on said customized launch vehicles.

18. A method as in claim 14, including steps of
updating said empirical model of operation in response to results of a launch.

19. A method as in claim 1, wherein
the customizing of the selected launch vehicle includes steps of
adjustment with respect to the selected launch vehicle of one or more of: weight or balance, attitude control, or air launch parameters, to provide for each one of a plurality of payload objects reaching a distinct designated trajectory.

* * * * *